(12) United States Patent
Yeh et al.

(10) Patent No.: US 11,597,394 B2
(45) Date of Patent: Mar. 7, 2023

(54) EXPLAINING BEHAVIOR BY AUTONOMOUS DEVICES

(71) Applicant: SRI International, Menlo Park, CA (US)

(72) Inventors: Chih-hung Yeh, Alameda, CA (US); Boone Adkins, Millbrae, CA (US); Melinda T. Gervasio, Mountain View, CA (US); Karen L. Myers, Menlo Park, CA (US); Rodrigo de Salvo Braz, San Francisco, CA (US)

(73) Assignee: SRI INTERNATIONAL, Menlo Park, CA (US)

( * ) Notice: Subject to any disclaimer, the term of this patent is extended or adjusted under 35 U.S.C. 154(b) by 456 days.

(21) Appl. No.: 16/222,623

(22) Filed: Dec. 17, 2018

(65) Prior Publication Data
US 2020/0189603 A1 Jun. 18, 2020

(51) Int. Cl.
G06N 20/00 (2019.01)
B60W 40/09 (2012.01)
(Continued)

(52) U.S. Cl.
CPC .......... *B60W 40/09* (2013.01); *G05D 1/0088* (2013.01); *G05D 1/0221* (2013.01); *G06N 20/00* (2019.01);
(Continued)

(58) Field of Classification Search
CPC ....... B60W 40/09; G07C 5/085; G06N 20/00; G06N 20/10; G06N 3/006; G06N 3/0454;
(Continued)

(56) References Cited

U.S. PATENT DOCUMENTS 10,372,130 B1   8/2019  Kaushansky et al.
2003/0233569 A1  12/2003  Geib et al.
(Continued)

FOREIGN PATENT DOCUMENTS

CN   106683672 A   5/2017
CN   109242041 A   1/2019
(Continued)

OTHER PUBLICATIONS

Gersavio et al., "Explanation to Avert Surprise," Explainable Smart Systems Workshop (ExSS) at ACM IUI 2018, Toyko, Japan, Mar. 2018, 4 pp.
(Continued)

*Primary Examiner* — Hunter B Lonsberry
*Assistant Examiner* — Matthew J. Reda
(74) *Attorney, Agent, or Firm* — Shumaker & Sieffert, P.A.

(57) ABSTRACT

In general, the disclosure describes various aspects of techniques for evaluating decisions determined by autonomous devices. A device comprising a memory and a processor may be configured to perform the techniques. The memory may store first state data representative of a first observational state detected by an autonomous device, and first action data representative of one or more first actions the autonomous device performs responsive to detecting the first observational state. The processor may execute a computation engine configured to identify, based on the first action data, a first inflection point representative of changing behavior of the autonomous device. The computation engine may further be configured to determine, based on the first inflection point, first explanatory data representative of portions of the first state data on which the autonomous device relied that explain the changing behavior of the autonomous device, and output the first explanatory data.

20 Claims, 5 Drawing Sheets

(51) Int. Cl.
    G05D 1/00       (2006.01)
    G07C 5/08       (2006.01)
    G05D 1/02       (2020.01)

(52) U.S. Cl.
    CPC ..... G07C 5/085 (2013.01); *G05D 2201/0213* (2013.01)

(58) Field of Classification Search
    CPC ........ G06N 3/088; G06N 3/126; G06N 5/003; G06N 5/045; G06N 5/046; G05D 1/0088; G05D 1/0221; G05D 2201/0213
    See application file for complete search history.

(56) References Cited

U.S. PATENT DOCUMENTS

| | | |
|---|---|---|
| 2005/0054381 A1 | 3/2005 | Lee et al. |
| 2007/0016464 A1 | 1/2007 | Yen et al. |
| 2009/0307162 A1 | 12/2009 | Bui et al. |
| 2010/0179689 A1 | 7/2010 | Lin |
| 2013/0173504 A1* | 7/2013 | Tu .................. G06K 9/6256 706/12 |
| 2014/0052680 A1 | 2/2014 | Nitz et al. |
| 2014/0330479 A1* | 11/2014 | Dolgov ............... B60W 30/143 701/28 |
| 2017/0200061 A1* | 7/2017 | Julian ................ G06K 9/00791 |
| 2017/0318035 A1 | 11/2017 | Baughman et al. |
| 2018/0174457 A1* | 6/2018 | Taylor ................ G06K 9/00302 |
| 2019/0026475 A1 | 1/2019 | Carroll et al. |
| 2019/0049267 A1* | 2/2019 | Huang .................. G06N 20/00 |
| 2019/0113973 A1 | 4/2019 | Coleman et al. |
| 2019/0171187 A1 | 6/2019 | Cella et al. |
| 2019/0244133 A1 | 8/2019 | Nakada et al. |
| 2019/0335006 A1 | 10/2019 | George et al. |
| 2019/0384292 A1* | 12/2019 | Aragon .................... G07C 5/02 |
| 2020/0026265 A1 | 1/2020 | Gocev et al. |
| 2020/0134484 A1 | 4/2020 | Hazard et al. |
| 2020/0189603 A1 | 6/2020 | Yeh et al. |
| 2020/0193311 A1 | 6/2020 | Myers et al. |
| 2020/0320435 A1 | 10/2020 | Sequeira et al. |

FOREIGN PATENT DOCUMENTS

| | | |
|---|---|---|
| WO | 2018123606 A1 | 7/2018 |
| WO | 2019052810 A1 | 3/2019 |

OTHER PUBLICATIONS

Gersavio et al., "Explanation to Avert Surprise," Poster Presentation in Workshops on Explainable Smart Systems (ExSS) at ACM IUI 2018, Toyko, Japan, Mar. 2018, 1 pp.
Lombrozo, Simplicity and probability in causal explanation. Elsevier; Cognitive Psychology, vol. 55, Issue 3, Nov. 2007, pp. 232-257.
Abbeel et al., "Apprenticeship Learning via Inverse Reinforcement Learning," ICML '04: Proceedings of the twenty-first International Conference on Machine Learning, Jul. 2004, 8 pp.
Oliehoek et al., "Exploiting Locality of Interaction in Factored Dec-POMDPs," Proc. of 7th Int. Conf. on Autonomous Agents and Multiagent Systems (AAMAS 2008), May 12-16, 2008, pp. 517-524.
Ribeiro et al.,"Why Should I Trust You?: Explaining the Predictions of Any Classifier," KDD '16 Proceedings of the 22nd ACM SIGKDD International Conference on Knowledge Discovery and Data Mining, Aug. 13-17, 2016, 10 pp.
Yeh et al., "Bridging the Gap: Converting Human Advice into Imagined Examples," Advances in Cognitive Systems 6, Aug. 2018, 20 pp.
Watkins, "Learning from Delayed Rewards," Ph D. Dissertation, King's College, May 1989, 241 pp.
Yeh, "Inducing rule-like learning in connectionist architectures," Poster Presentation in International Conference on Mathematical Neuroscience, May 24, 2017, 1 pp.

Adomavicius et al., "Improving aggregate recommendation diversity using ranking-based techniques," IEEE Transactions on Knowledge and Data Engineering; 24(5), May 2012, 15 pp.
Berry et al., "The design of a usercentric scheduling system for multifaceted real-world problems," ICAPS'07 Workshop on Moving Planning and Scheduling Systems into the Real World, Sep. 2007, 6 pp.
Berry et al., "Neptune: A Mixed-Initiative Environment for Planning and Scheduling," Proceedings of the Twenty-First International Florida Artificial Intelligence Research Society Conference (FLAIRS 2008), May 15-17, 2008, pp. 573-574.
Cheng et al., "A BIM-based framework for material logistics planning," In: Proc. 23rd Ann. Conf. of the Int'l. Group for Lean Construction. Jul. 29-31, 2015, 10 pp.
Levitt et al., Sightplan: A Blackboard Expert System for Constraint Based Spatial Reasoning about Construction Site Layout. Technical Report No. 20, Stanford University, Oct. 1989, 74 pp.
Marler et al., "Survey of multi-objective optimization methods for engineering," Structural and Multidisciplinary Optimization, 26(6), Mar. 23, 2004, pp. 369-395.
Myers et al., "Generating Qualitatively Different Plans through Metatheoretic Biases," Proc. of 16th National Conference on Artificial Intelligence (AAAI-99), May 1999, 7 pp.
Myers et al., "Policy-based Agent Directability," Chapter 9 in Agent Autonomy, Springer Science+Business Media New York, Mar. 31, 2003, 18 pp.
Myers et al., "A Mixed-initiative Framework for Robust Plan Sketching," Proc. of the 13th International Conference on Automated Planning and Scheduling (ICAPS-03), AAAI, Apr. 2003, pp. 256-265.
Said et al., "Automated multi-objective construction logistics optimization system," Automation in Construction vol. 43, Jul. 2014, pp. 110-122.
Desjardins et al., "DD-PREF: A language for expressing preferences over sets," AAAI, Jan. 2005, pp. 620-626.
Zuluaga et al., "Active learning for multi-objective optimization," ICML'13: Proceedings of the 30th International Conference on International Conference on Machine Learning, vol. 28, Jun. 2013, 9 pp.
U.S. Appl. No. 62/907,890, by Melinda T. Gervasio et al., filed Sep. 30, 2019.
U.S. Appl. No. 16/224,360, filed Dec. 18, 2018, naming inventors Myers et al.
Agrawal et al., "Fast Algorithms for Mining Association Rules in Large Databases," In Proceedings of the 20th International Conference on Very Large Data Bases (VLDB '94), Sep. 1994, 32 pp.
Alzantot, "Deep Reinforcement Learning Demysitifed (Episode 2)—Policy Iteration, Value Iteration and Q-learning," Retrieved Aug. 31, 2020 from: https://medium.com/@m.alzantot/deep-reinforcement-learning-demysitifed-episode-2-policy-iteration-value-iteration-and-q-978f9e89ddaa, Jul. 8, 2017, 11 pp.
Amir et al., "HIGHLIGHTS: Summarizing Agent Behavior to People," In Proceedings of the 17th International Conference on Autonomous Agents and Multiagent Systems (AAMAS '18), Jul. 10-15, 2018, 9 pp.
De Graaf et al., "How People Explain Action (and Autonomous Intelligent Systems Should Too)," AAAI 2017 Fall Symposium on Artificial Intelligence for Human-Robot Interaction, Technical Report FS-17-01, Nov. 2017, pp. 19-26.
Dijkstra, "A note on two problems in connexion with graphs," Numer. Math. 1(1), Dec. 1, 1959, pp. 269-271.
Fuglede et al., "Jensen-Shannon Divergence and Hilbert Space Embedding," In Proceedings of the International Symposium on Information Theory (SIT 2004), Jun. 27-Jul. 2, 2004, 6 pp.
Han et al., "Mining Frequent Patterns without Candidate Generation: A Frequent-Pattern Tree Approach," Data Mining and Knowledge Discovery: 8(1), Jan. 1, 2004, pp. 53-87.
Hayes et al., "Improving Robot Controller Transparency Through Autonomous Policy Explanation," In Proceedings of the 2017 ACM/IEEE International Conference on Human-Robot Interaction (HRI '17), Mar. 6-9, 2017, 10 pp.
Jaccard, "The Distribution of the Flora in the Alpine Zone," The New Phytologist:11(2), Feb. 29, 1912, pp. 37-50.

(56) References Cited

OTHER PUBLICATIONS

Kaelbling et al., "Planning and acting in partially observable stochastic domains," Artificial Intelligence 101(1), Jan. 17, 1998, pp. 99-134.

Khan et al., "Minimal Sufficient Explanations for Factored Markov Decision Processes," AAAI Press, In Proceedings of the 19th International Conference on International Conference on Automated Planning and Scheduling (ICAPS'09), Sep. 2009, 7 pp.

Knox et al., "Interactively Shaping Agents via Human Reinforcement: The TAMER Framework," ACM, In Proceedings of the Fifth International Conference on Knowledge Capture (K-CAP '09), Sep. 1-4, 2009, 8 pp.

Littman, "Memoryless Policies: Theoretical Limitations and Practical Results," MIT Press, In Proceedings of the Third International Conference on Simulation of Adaptive Behavior: From Animals to Animats 3: vol. 3, Aug. 1994, 8 pp.

Miller, Explanation in artificial intelligence: Insights from the social sciences. Artificial Intelligence: 267, arXiv: 1706.07269, Aug. 15, 2018, 66 pp.

Mulder et al., "Species evenness and productivity in experimental plant communities," OIKOS: 107(1), Oct. 2004, pp. 50-63.

Sequeira et al., An Associative State-Space Metric for Learning in Factored MDPs. Springer Berlin Heidelberg, In Proceedings of the 16th Portuguese Conference on Artificial Intelligence (EPIA 2013); LNAI 8154, Sep. 2013, pp. 163-174.

Sequeira et al., "Interestingness Elements for Explainable Reinforcement Learning through Introspection," IUI Workshops'19, Mar. 20, 2019, 7 pp.

Sequeira et al., "Interestingness Elements for Explainable Reinforcement Learning: Understanding Agents Capabilities and Limitations," arXiv.org: arXiv:1912.09007v1, Dec. 19, 2019, 46 pp.

Sequeira et al., "Real-Time Sensory Pattern Mining for Autonomous Agents," Springer Berlin Heidelberg, In Proceedings of the 6th International Workshop on Agents and Data Mining Interaction (ADMI 2010); LNCS 5980, May 2010, pp. 71-83.

Van der Waa et al., "Contrastive Explanations for Reinforcement Learning in terms of Expected Consequences," arXiv preprint arXiv:1807.08706, Jul. 23, 2018, 6 pp.

Wang et al., "The Impact of POMDP-Generated Explanations on Trust and Performance in Human-Robot Teams," In Proceedings of the 15th International Conference on Autonomous Agents and Multiagent Systems (AAMAS '16), May 9-13, 2016, 9 pp.

Watkins et al., "Technical Note: Q-Learning," Machine Learning; 8(3), May 1, 1992, pp. 279-292.

Nicola et al., "Improvement of PMSM Control Using Reinforcement Learning Deep Deterministic Policy Gradient Agent", 2021 21st International Symposium on Power Electronics (Ee), IEEE, Oct. 2021, pp. 1-6.

Song et al., "Memristive Neural Network Based Reinforcement Learning with Reward Shaping for Path Finding", 2018 5th International Conference on Information, Cybernetics, and Computational Social Systems (ICCSS), IEEE, Aug. 2018, pp. 200-205.

Zhong et al., "Deep Actor-Critic Reinforcement Learning for Anomaly Detection", arXiv.1908.10755v1, Aug. 2019, pp. 1-6.

\* cited by examiner

EXPLAINING BEHAVIOR BY AUTONOMOUS DEVICES

TECHNICAL FIELD

This disclosure is related to autonomous devices operating according to artificial intelligence.

BACKGROUND

Artificial intelligence (AI) generally refers to a way by which autonomous devices operate to identify decisions responsive to changing observed state. AI models may utilize machine learning (ML), which typically involves training a machine learning model with training data to produce a trained model able to generalize properties of data based on similar patterns with the training data. Training the model may involve learning model parameters by optimizing an objective function, thus optimizing a likelihood of observing the training data given the model. Given variabilities in the training data, the extent of training samples within the training data, and other limitations to training, and the complexity of modern machine learning models, it is often difficult to explain decisions that appear erratic or fail to meet expectations.

SUMMARY

In general, the disclosure describes various aspects of techniques for facilitating evaluation of decisions by autonomous devices. The techniques may enable a computing device to identify state data representative of an observation state detected by the autonomous device, and action data representative of the action taken by the autonomous device responsive to detecting the observational state. Based on the action data, the autonomous device may identify an inflection point representative of a changing behavior of the autonomous device. Based on this inflection point, the computing device may identify explanatory data representative of the state data on which the autonomous device relied when performing the action.

The techniques may provide one or more technical advantages. For example, various aspects of the techniques may facilitate evaluation of decisions made by machine learning models. The resulting explanatory data may enable diagnosis of erratic behavior and thereby enable updates to a complex machine learning model that results in action identification that meets expectations. The techniques may, as a result, improve the operation of autonomous systems in terms of potentially reducing erratic behavior that may result in wasted processor cycles, memory consumptions, bandwidth consumption (both network and bus bandwidth), and other computing resources, while also, or alternatively improving the very operation of the autonomous system itself as measured in terms of performing expected actions.

In one example, various aspects of the techniques are directed to a device comprising: one or more memories configured to: store first state data representative of a first observational state detected by an autonomous device; and store first action data representative of one or more first actions the autonomous device performs responsive to detecting the first observational state; and a computation engine executing one or more processors, the computation engine configured to: identify, based on the first action data, a first inflection point representative of changing behavior of the autonomous device; determine, responsive to identifying the first inflection point, first explanatory data representative of portions of the first state data on which the autonomous device relied that explain the changing behavior of the autonomous device; and output the first explanatory data.

In another example, various aspects of the techniques are directed to a method of machine learning evaluation, the method comprising: obtaining, by a computation engine executed by one or more processors, first state data representative of a first observational state detected by an autonomous device; obtaining, by the computation engine, first action data representative of one or more first actions the autonomous device performs responsive to detecting the first observational state; identifying, based on the first action data and by the computation engine, a first inflection point representative of changing behavior of the autonomous device; determining, responsive to identifying the first inflection point and by the computation engine, first explanatory data representative of portions of the first state data on which the machine learning model relied that explain the changing behavior of the autonomous device; and outputting, by the computation engine, the first explanatory data.

In another example, various aspects of the techniques are directed to a non-transitory computer-readable storage medium having stored thereon instructions that, when executed, cause one or more processors to execute a computation engine configured to: obtain first state data representative of a first observational state detected by an autonomous device, wherein the autonomous device is operating according to a trained machine learning model; obtain first action data representative of one or more first actions the autonomous device performs responsive to detecting the first observational state; identifying, based on the first action data, a first inflection point representative of changing behavior of the autonomous device; determining, responsive to identifying the first inflection point, first explanatory data representative of portions of the first state data on which the machine learning model relied that explain the changing behavior of the autonomous device; and outputting the first explanatory data.

The details of one or more examples of the techniques of this disclosure are set forth in the accompanying drawings and the description below. Other features, objects, and advantages of the techniques will be apparent from the description and drawings, and from the claims.

DETAILED DESCRIPTION

Figure 1:
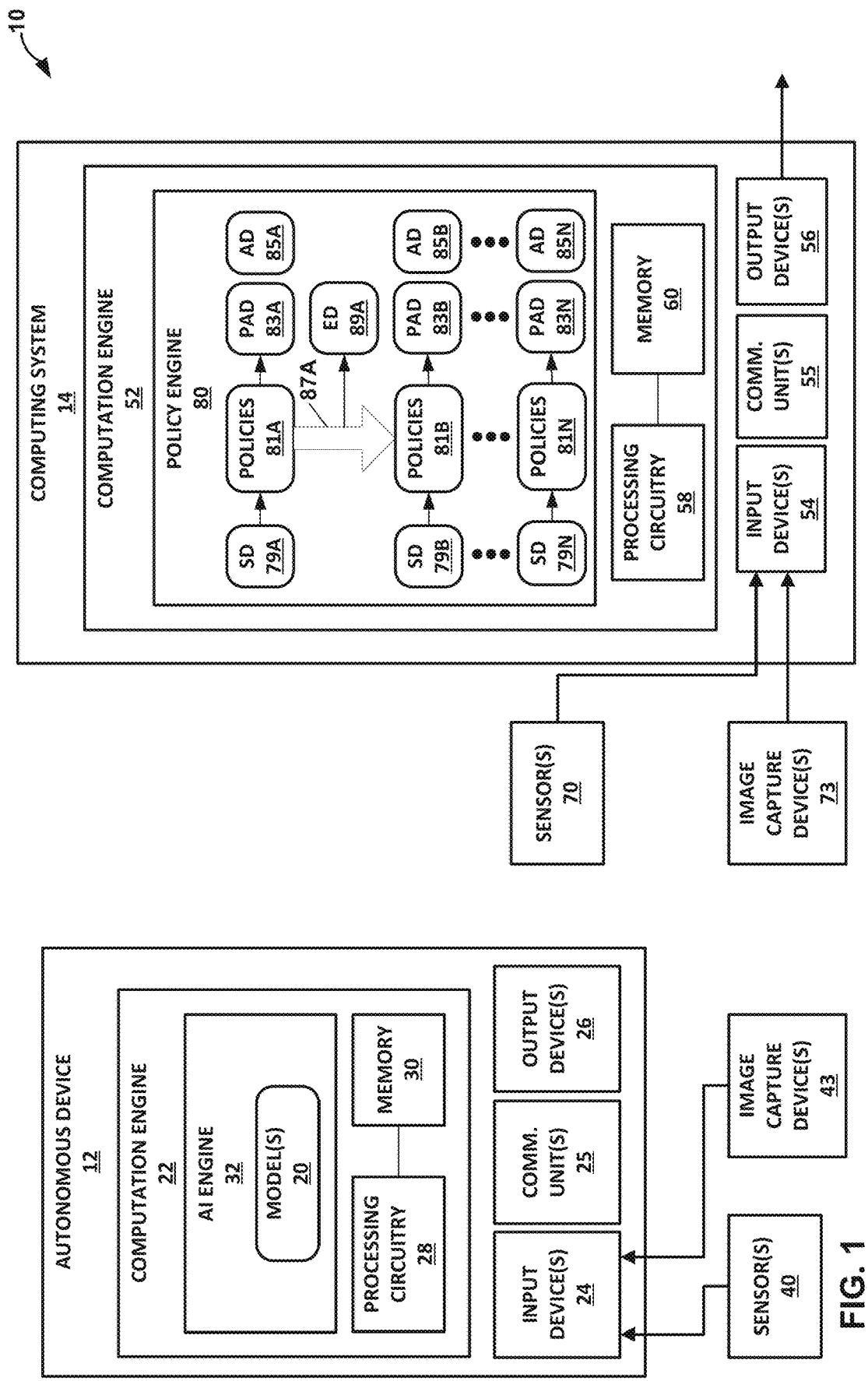
FIG. 1 is an example of a system that may be configured to perform various aspects of the evaluation techniques described in this disclosure.

Machine learning may generally enable a computing device to analyze input data and identify an action to be performed responsive to the input data. Each machine learning model may be trained using training data that reflects likely input data. The training data may be labeled or unlabeled (meaning that the correct action to be taken based on a sample of training data is explicitly stated or not explicitly stated, respectively). The training of the machine learning model may be guided (in that a designer, such as a computer programmer may direct the training to guide the machine learning model to identify the correct action in view of the input data) or unguided (in that the machine learning model is not guided by a designer to identify the correct action in view of the input data). In some instances, the machine learning model is trained through a combination of labeled and unlabeled training data, a combination of guided and unguided training, or possibly combinations thereof.

Even when the machine learning model undergoes guided training with labeled training data (which may represent what might be considered the most directed training that should result in more expected actions compared to unguided training using unlabeled training data or various combinations thereof), there are limits to training the machine learning model as such training is not often exhaustive (in terms of fully sampling each feature of the space defined by the input data). In other words, there is limited training data that may not fully address the wider variability of the input data. Further, a potential benefit of machine learning models is to avoid exhaustive and time-consuming comprehensive training but still produce a machine learning model that performs accurate action (which is another way of referring to a "decision") identification through limited sampled training. As such, the resulting machine learning module may operate erratically (selecting surprising or unforeseen actions) in the context of certain (possibly unforeseen or unlikely) input data for which there were only limited (or no) samples in the training data or for which training was not fully performed.

Given the complexity of the machine learning model, it may be difficult to explain in detail a basis upon which the machine learning model identified the various actions, particularly when such actions appear to be erratic or unexpected. To illustrate, consider an example of a machine learning model that implements a deep neural network, which may include three or more layers of neural networks, each of which is trained using training data to identify an action. Attempting to explain how each neural network of the deep neural network weighed each aspect of the input data to identify what may be considered an erratic action may entail significant analysis and understanding of the training data, the input data, or combinations thereof.

Various aspects of the techniques described in this disclosure facilitate the evaluation of autonomous systems that operate according to machine learning models. The techniques may enable a computing device to construct an approximation of the machine learning model through an iterative process by which a number of policies are defined to represent the machine learning model. The computing device may begin, in either a controlled environment (meaning that, as one example, the computing device can specify the input data) or uncontrolled environment (meaning that, as one example, the computing device can only collect the input data), by obtaining state data representative of an observational state detected by the autonomous device (which may include state data about the autonomous device itself, such as an orientation, a rate of travel, a power status, a temperature status, or any other statuses of the autonomous device itself, including processing or internal state such as curiosity, goals achieved and needed, telemetry, etc.). The computing device may next obtain action data representative of actions the autonomous system performs responsive to detecting the observational state data.

Based on the state data and the action data, the computing device may define a first policy, applying the first policy to subsequent state data to obtain predicted action data representative of predicted actions that the machine learning model is predicted to perform responsive to the subsequent state data. The policy may, as one example, represent a linear classifier. A linear classifier may refer to any classifier that enables a classification decision based on a value of a linear combination of characteristics. In the context of a machine learning model, the linear classifier may attempt to classify inputs into expected actions, classifying those actions as expected or unexpected.

The computing device may next identify, based on the action data and the predicted action data, a first inflection point representative of changing behavior of the machine learning model. To illustrate, the computing device may identify the inflection point when the predicted action data differs from the actual action data. In other words, when the policy, which is assumed for purposes of further explanation to be a linear classifier, no longer produces accurate action data, there may be non-linear decision making that is difficult to explain. In this illustration, the inflection point may represent a shift from what was assumed to be a linear model to a non-linear model. The computing device may determine, based on the inflection point, explanatory data representative of portions of the state data on which the machine learning model relied that explain the changing behavior of the machine learning model.

The computing device may then output the explanatory data. In some examples, outputting the explanatory data may enable computer programmers to better understand and thereafter update the machine learning model to reduce or potentially remove the likelihood of performing the erratic behavior. In some instances, the explanatory data may enable the computer programmers to further train the machine learning model using training samples that may reduce the likelihood of the machine learning model performing the erratic behavior.

In this way, various aspects of the techniques may facilitate evaluation of decisions made by machine learning models. The resulting explanatory data may enable diagnosis of erratic behavior and thereby enable updates to a complex machine learning model that results in action identification that meets expectations. The techniques may, as a result, improve the operation of autonomous systems in terms of potentially reducing erratic behavior that may result in wasted processor cycles, memory consumptions, bandwidth consumption (both network and bus bandwidth), and other computing resources, while also improving the very operation of the autonomous system itself as measured in terms of performing expected actions.

FIG. 1 is an example of a system that may be configured to perform various aspects of the evaluation techniques described in this disclosure. As shown in the example of FIG. 1, system 10 may include an autonomous device 12 and a computing system 14. Autonomous device 12 may represent any type of device configured to operate according to artificial intelligence (AI) models 20 that autonomously identify actions responsive to detected observational state data and perform the identified actions to achieve an objective. Computing system 14 represents one or more computing devices configured to evaluate autonomous device according to various aspects of the techniques described herein.

Examples of autonomous device 12 may include an unmanned aerial vehicle (UAV)—such as a so-called fixed wing drone, a quadcopter drone, or other unmanned helicopters of various blade numbers, an airplane, or hybrids thereof—a manned aerial vehicles of similar types, a ground vehicle (such as a car, truck, semitruck, motorcycle, bicycle, tank, farm equipment, etc.), a robot, non-physical software agents (such as personal digital assistants and/or cyber agents to provide a few examples), and/or any other type of autonomous device capable of operating autonomously according to AI models 20. As used herein, "A and/or B" should be understood to mean "A" alone, "B" alone, or both "A and B." Further, any reference to "one or more of A and B" should be understood as "A" alone, "B" alone, or both "A and B" and not as one or more of each of "A" and "B."

Autonomous device 12 may include a computation engine 22, input devices 24, communication units 25, and output devices 26. Computation engine 22 may represent any combination of processing circuitry 28 and memories 30 capable of executing and storing (respectively) an AI engine 32 that operates according to one or more AI models 20.

Memory 30 may store information for processing during operation of computation engine 22. In some examples, memory 30 may include temporary memories, meaning that a primary purpose of the one or more storage devices is not long-term storage. Memory 30 may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art.

Memory 30, in some examples, also include one or more computer-readable storage media (which may also be referred to as "non-transitory computer-readable media" or "non-transitory computer-readable storage media"). The computer-readable storage media may be configured to store larger amounts of information than volatile memory. The computer-readable storage media may further be configured for long-term storage of information as non-volatile memory space and retain information after activate/off cycles. Examples of non-volatile memories include magnetic hard disks, optical discs, floppy disks, Flash memories, or forms of electrically programmable memories (EPROM) or electrically erasable and programmable (EEPROM) memories. Whether representative of volatile or non-volatile memory, memory 30 may store program instructions and/or data associated with one or more of the modules, units, and/or engines described in accordance with one or more aspects of this disclosure.

Processing circuitry 28 and memory 30 may provide an operating environment or platform for computation engine 22, which may be implemented as software, but may in some examples include any combination of hardware, firmware, and software. Processing circuitry 28 may execute instructions and memory 30 may store instructions and/or data of one or more modules, units, and/or engines. The combination of processing circuitry 28 and memory 30 may retrieve, store, and/or execute the instructions and/or data of one or more applications, modules, units, engines, and/or software. Processing circuitry 28 and memory 30 may also be operably coupled to one or more other software and/or hardware components, including, but not limited to, one or more of the components illustrated in FIG. 1.

Computation engine 22 may perform operations described using software, hardware, firmware, or a mixture of hardware, software, and firmware residing in and/or executing at autonomous device 12. Computation engine 22 may execute each of the module(s), unit(s), and/or engine(s) with multiple processors or multiple devices. Computation engine 22 may execute one or more of such modules as a virtual machine or container executing on underlying hardware. One or more of such modules may execute as one or more services of an operating system or computing platform. One or more of such modules may execute as one or more executable programs at an application layer of a computing platform.

One or more input devices 24 of autonomous device 12 may generate, receive, or process input. Such input may include input from a keyboard, pointing device, voice responsive system, video camera (which may also function to capture still images), biometric detection/response system, button, sensor, mobile device, control pad, microphone, presence-sensitive screen, network, or any other type of device for detecting input from a human or machine.

One or more output devices 26 of autonomous device 12 may generate, transmit, or process output. Examples of output are tactile, audio, visual, and/or video output. Output devices 26 may include a display, sound card, video graphics adapter card, speaker, presence-sensitive screen, one or more USB interfaces, video and/or audio output interfaces, or any other type of device capable of generating tactile, audio, video, or other output. Output devices 26 may include a display device, which may function as an output device using technologies including liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating tactile, audio, and/or visual output. In some examples, autonomous device 12 may include a presence-sensitive display that may serve as a user interface device that operates both as one or more input devices 24 and one or more output devices 26.

One or more communication units 25 of autonomous device 12 may communicate with devices external to autonomous device 12 (or among separate computing devices of autonomous device 12) by transmitting and/or receiving data, and may operate, in some respects, as both an input device and an output device. In some examples, communication units 25 may communicate with other devices over a network. In other examples, communication units 25 may send and/or receive radio signals on a radio network such as a cellular radio network. Examples of communication units 25 include a network interface card (e.g. such as an Ethernet card), an optical transceiver, a radio frequency transceiver, a GPS receiver, or any other type of device that can send and/or receive information. Other examples of communication units 25 may include Bluetooth®, GPS, 3G, 4G, and Wi-Fi® radios found in mobile devices as well as Universal Serial Bus (USB) controllers and the like.

As further shown in the example of FIG. 1, input devices 24 are configured to receive electrical signal input from one or more sensors, such as sensor(s) 40 and image capture device(s) 43 and convert the electrical signal input into a form usable by autonomous device 12. Sensors 40 may represent a wide variety of sensors configured to obtain state data representative of an observational state of both a surrounding environment represented by autonomous system 10 and autonomous device 12.

Sensors 40 may include, in some examples, one or more of a GPS sensor configured to obtain location state data indicative of a location of autonomous device 12, a gyroscope sensor configured to obtain orientation and velocity data indicative of an orientation and/or angular velocity of autonomous device 12, a proximity sensor configured to obtain proximity data indicative of a proximity of the autonomous device 12 to an object (such as a human), an accelerometer configured to obtain additional orientation data or other data indicative of an acceleration of the autonomous device 12 in a direction, a barometer configured to obtain relative pressure data indicative of the relative pressure in the environment, and/or a compass configured to obtain directional data indicative of a direction in which the autonomous device 12 is facing.

As such, input devices 40 may include software or hardware configured to convert a received signal input from an analog signal from sensors 40 to a digital signal for processing by computation engine 22. In another example, input devices 40 may include software or hardware configured to compress, decompress, transcode, encrypt, or decrypt a received signal from sensors 40 into a form usable by autonomous device 12. In another example, communication units 25 may represent a network interface device to receive packetized data or other data representative of signals generated by sensor(s) 40 or images generated by image capture device(s) 43.

As also shown in the example of FIG. 1, computing system 14 includes a computation engine 52, one or more input devices 54, one or more communication devices 55, and one or more output devices 56. Computation engine 52 may be similar, if not substantially similar, to computation engine 22. As such, computation engine 52 also includes processing circuitry 58 (which may be similar, if not substantially similar, to processing circuit 28) and a memory 60 (which may be similar, if not substantially similar, to memory 30). Likewise, input devices 54, communication units 55, and output devices 56 may be similar, if not substantially similar, to respective input device 24, communication units 25, and output devices 26. Input devices 54 may also interface with one or more sensors 70 and one or more image capture devices 73, both of which may be similar, if not substantially similar, to respective sensors 40 and image capture devices 43.

As noted above, computation engine 22 is configured to execute AI engine 32 that operates according to one or more models, such as machine learning models 20. Models 20 may include any number of different types of machine learning models, such as neural networks, deep neural networks, dense neural networks, and the like. Although described with respect to machine learning models, the techniques described in this disclosure are also applicable to other types of AI models, including rule-based models, finite state machines, and the like.

Machine learning may generally enable a computing device to analyze input data and identify an action to be performed responsive to the input data. Each machine learning model may be trained using training data that reflects likely input data. The training data may be labeled or unlabeled (meaning that the correct action to be taken based on a sample of training data is explicitly stated or not explicitly stated, respectively).

The training of the machine learning model may be guided (in that a designer, such as a computer programmer, may direct the training to guide the machine learning model to identify the correct action in view of the input data) or unguided (in that the machine learning model is not guided by a designer to identify the correct action in view of the input data). In some instances, the machine learning model is trained through a combination of labeled and unlabeled training data, a combination of guided and unguided training, or possibly combinations thereof. Examples of machine learning include nearest neighbor, naïve Bayes, decision trees, linear regression, support vector machines, neural networks, k-Means clustering, Q-learning, temporal difference, deep adversarial networks, evolutionary algorithms or other supervised, unsupervised, semi-supervised, or reinforcement learning algorithms to train one or more models.

Even when the machine learning model undergoes guided training with labeled training data (which may represent what might be considered the most directed training that should result in more expected actions compared to unguided training using unlabeled training data or various combinations thereof), there are limits to training the machine learning model as such training is not often exhaustive (in terms of fully sampling each feature of the space defined by the input data). In other words, there is limited training data that may not or may not fully address the wider variability of the input data. Further, a potential benefit of machine learning models is to avoid exhaustive and time-consuming comprehensive training but still produce a machine learning model that performs accurate action (which is another way of referring to a "decision") identification through limited sampled training. As such, resulting machine learning module 20 may operate erratically (selecting surprising or unforeseen actions) in the context of certain (possibly unforeseen or unlikely) input data for which there were only limited (or no) samples in the training data or for which training was not fully performed.

Given the complexity of machine learning model 20, it may be difficult to explain in detail a basis upon which machine learning model 20 identified the various actions, particularly when such actions appear to be erratic or unexpected. To illustrate, consider an example of machine learning model 20 that implements a deep neural network, which may include three or more layers of neural networks, each of which is trained using training data to identify an action. Attempting to explain how each neural network of the deep neural network weighed each aspect of the input data to identify what may be considered an erratic action may entail significant analysis and understanding of the training data, the input data, or combinations thereof.

In accordance with various aspects of the techniques described in this disclosure, computation engine 20 may be configured to execute a policy engine 80 that facilitates the evaluation of autonomous device 12 that operate according to machine learning models 20. The techniques may enable policy engine 80 to construct an approximation of machine learning model 20 through an iterative process by which one or more policies 81A-81N ("policies 81") are defined to represent machine learning model 20. Policy agent 20 may begin, in either a controlled environment (meaning that, as one example, policy agent 20 can specify the input data) or uncontrolled environment (meaning that, as one example, the computing device can only collect the input data), by obtaining state data ("SD") 79A-79N ("SD 79") representative of an observational state detected by the autonomous device 12 (which may include state data about autonomous device 12 itself, such as an orientation, a rate of travel, a power status, a temperature status or any other statuses of autonomous device 12 itself). Policy engine 80 may next obtain action data ("AD") 85A-85N ("AD 85") representative of actions autonomous device 12 performs responsive to detecting observational state data 79 (which is another way of referring to "SD 79").

Based on state data 79 and action data 85, policy engine 80 may define a first policy 81A, applying policy 81A to subsequent state data 79A (which may be distinguished throughout through the use of subscripts with state data $79A_T$ denoting pre-policy training state data and state data $79A_S$ denoted post-policy subsequent state data) to obtain predicted action data (PAD) 83A representative of predicted actions that machine learning model 20 is predicted to perform responsive to the subsequent state data $79A_S$. The policy may, as one example, represent a linear classifier. A linear classifier may represent an additive combination of weighted features that are used to make a classification decision. One benefit to using a linear classifier is that linear classifiers may be more readily interpretable by humans.

Policy engine 80 may next identify, based on action data 85A and predicted action data 83A, a first inflection point 87A representative of changing behavior of machine learning model 20. To illustrate, policy engine 80 may identify inflection point 87A when predicted action data 83A differs from actual action data $79A_S$. In other words, when policy 81A, which is assumed for purposes of further explanation to be a linear classifier, no longer produces accurate predicated action data 83A, there may be non-linear decision making that is difficult to explain. In this illustration, inflection point 87A may represent a shift from what was assumed to be a linear model to a non-linear model. Policy engine 80 may determine, based on inflection point 87A, explanatory data (ED) 89A representative of portions of state data $79A_S$ on which machine learning model 20 relied that explain the changing behavior of machine learning model 20.

Policy engine 80 may then output explanatory data 89A. In some examples, outputting explanatory data 89A may enable designers to better understand and thereafter update machine learning model 20 to reduce or potentially remove the likelihood of performing the erratic behavior. In some instances, explanatory data 89A may enable the designers to further train machine learning model 20 using training samples that may reduce the likelihood of machine learning model 20 performing the erratic behavior.

In this way, various aspects of the techniques may facilitate evaluation of decisions made by machine learning models 20. The resulting explanatory data 89A may enable diagnosis of erratic behavior and thereby enable updates to a complex machine learning model 20 that results in action identification that meets expectations. The techniques may, as a result, improve the operation of autonomous device 12 in terms of potentially reducing erratic behavior that may result in wasted processor cycles, memory consumptions, bandwidth consumption (both network and bus bandwidth), and other computing resources. The techniques may also, or alternatively, improve the very operation of autonomous device 12 itself as measured in terms of performing expected actions.

Figure 2:
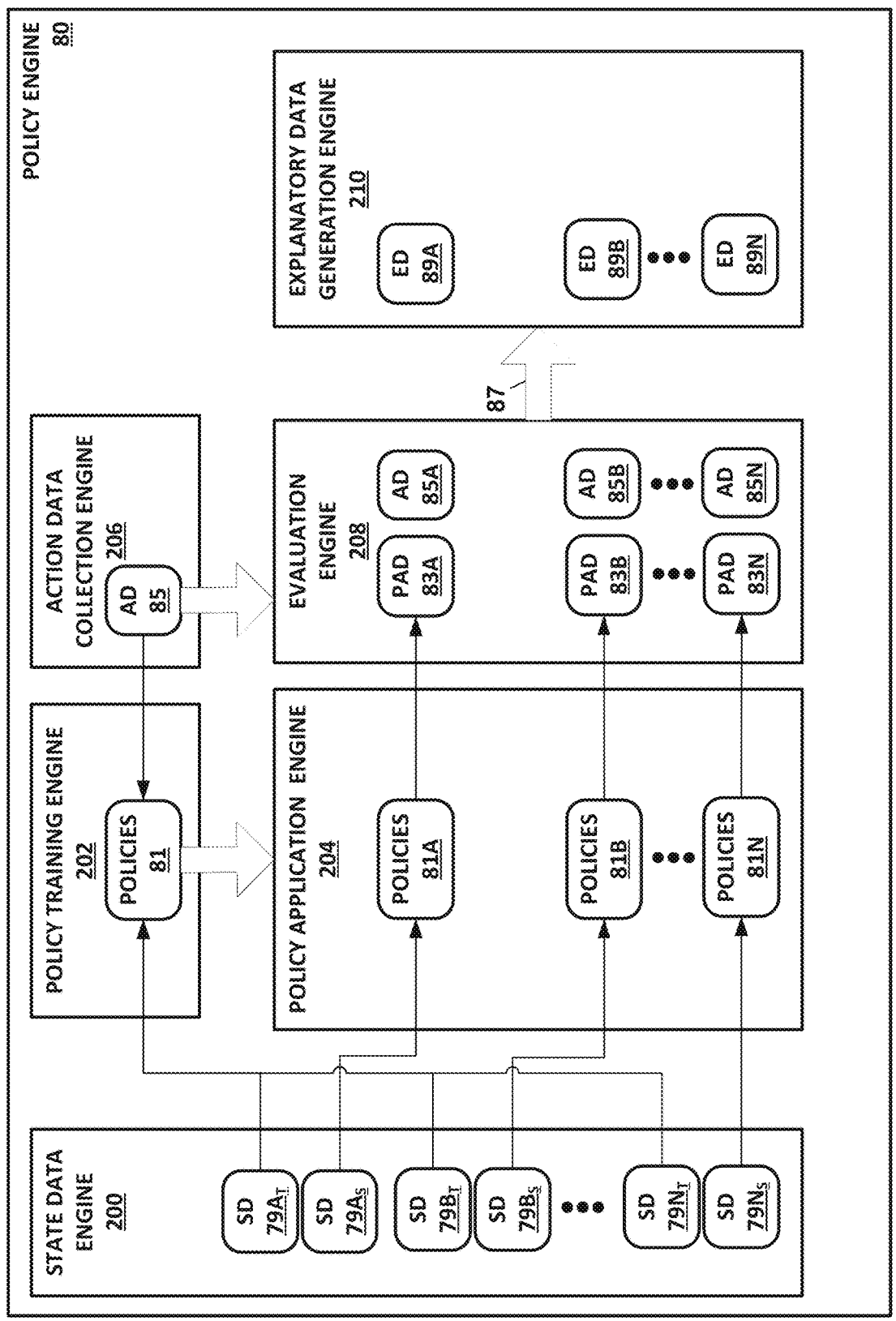
FIG. 2 is a block diagram illustrating an example of the policy engine of FIG. 1 in more detail.

FIG. 2 is a block diagram illustrating an example of the policy engine of FIG. 1 in more detail. As shown in the example of FIG. 2, policy engine 80 includes a state data engine 200, a policy training engine 202, a policy application engine 204, an action data collection engine 206, an evaluation engine 208, and an explanatory data generation engine 210.

State data engine 200 may represent a unit configured to obtain state data 79 representative of the observational state detected by autonomous device 12. In instances where there is full access to autonomous device 12 and the environment surrounding the autonomous device 12, state data engine 200 may iteratively specify state data 79 in a manner that explores some or all of the observational states capable of being detected by autonomous device 12. In instances where there is no or limited access to autonomous device 12, state data engine 200 may obtain state data 79 through inspection, via sensors 40, of the environment surrounding autonomous device 12 (or stated differently, the environment in which autonomous device 12 operates) and the device 12 itself. In some examples, state data engine 200 may collect state data 79 from sensors available to other platforms linked or connected to this platform.

Policy training engine 202 represents a unit configured to train, based on state data 79 and action data 85, policies 81. Policy training engine 202 may train one or more policies 81 concurrently. When multiple policies 81 are trained concurrently, each of the concurrently trained policies 81 may be trained for a different specialized region of predictability. As noted above, the policies 81 may represent, as one example, a linear classifier (which is one example of a linear model).

Policy training engine 202 may, in some examples, develop policies 81 sequentially. That is, given a trajectory of state and action pairs (as defined by state data $79A_T$ and action data 85A), policy training engine 202 may train policy 81A to predict the next action given the state data $79A_S$. When policy 81A fails to predict the next action correctly, policy training engine 202 may train, based on state data $79B_T$ and action data 85B, the next model, repeating until all most or possibly all points in the potential sample space are identified. The foregoing may be analogous to iterative processes for principal component analysis, except by minimizing for action prediction error, policy training engine 202 obtains policies 81 that each capture a principal mode of predictable behavior.

Policy application engine 204 represents a unit configured to apply policies 81 to state data 79 to obtain predicted action data 83 representative of one or more predicted actions that autonomous device 12 is predicted to perform responsive to the state data 79. As noted above, policy application engine 204 may apply each of policies 81 sequentially, iterating to the next one of policies 81 when predicated action data 83 differs from action data 85 (or, in other words, when evaluation engine 208 identifies an inflection point 87 representative of the changing behavior of autonomous device 12).

Action data collection engine 206 represents a unit configured to collect, via sensors 40 and/or image capture devices 43 (e.g., through image analysis), action data 85 representative of one or more actions autonomous device 12 performs responsive to detecting the observational state. In some example, action data collection engine 206 may interface directly with autonomous device 12 to collect action data 85. Action data collection engine 206 may provide action data 85 to policy training engine 202 and evaluation engine 208.

Figure 3B:
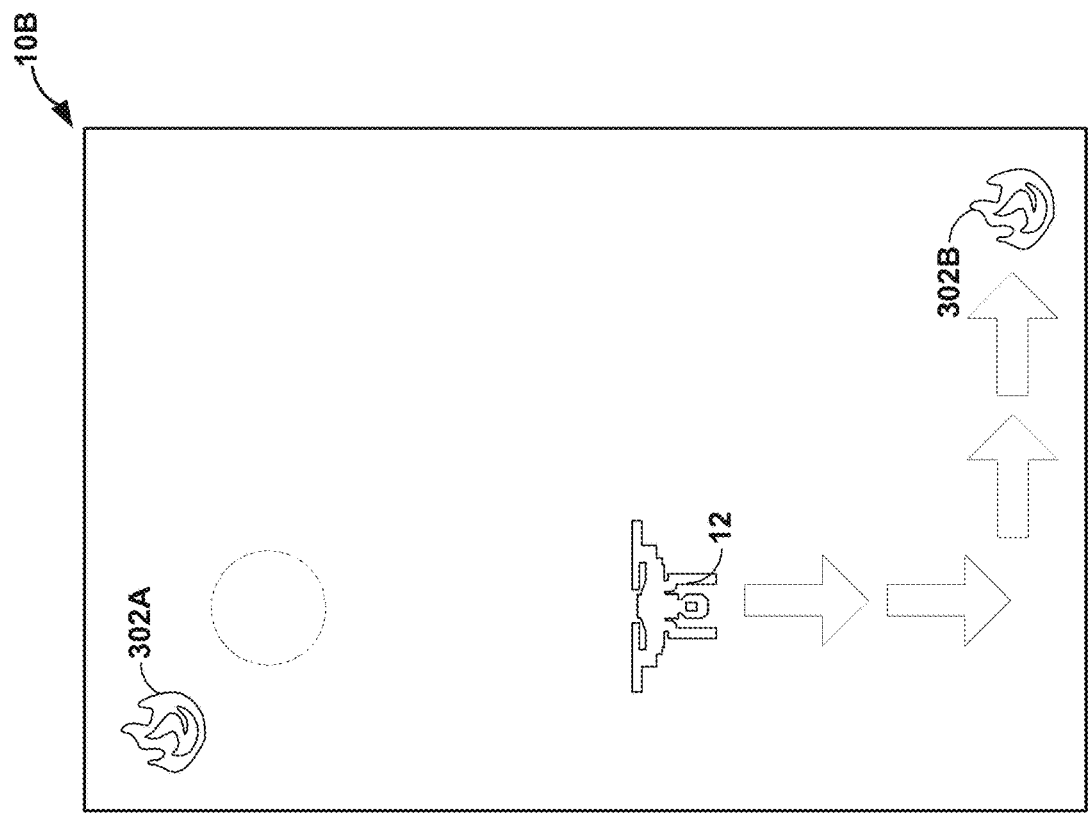
FIGS. 3A and 3B are diagrams illustrating an example of autonomous system of FIG. 1 in which the policy engine shown in FIGS. 1 and 2 has full access to the autonomous device shown in FIG. 1.
Figure 3A:
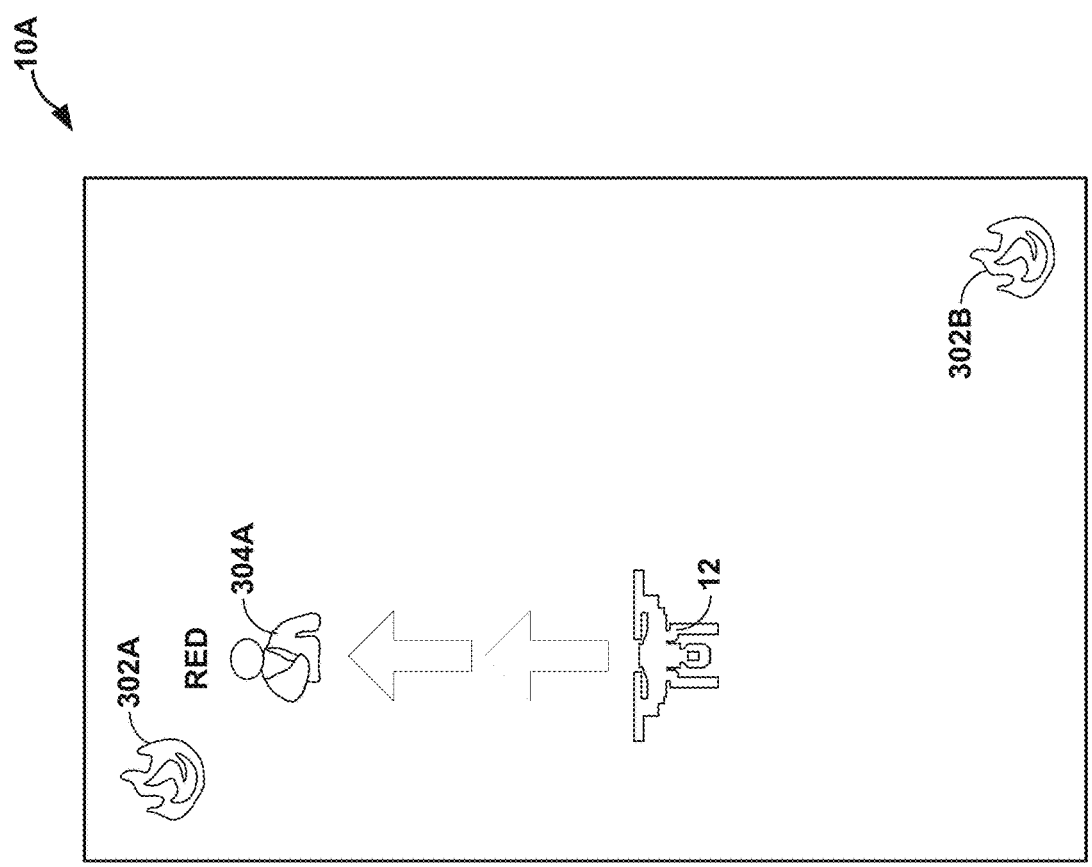
Figure 4:
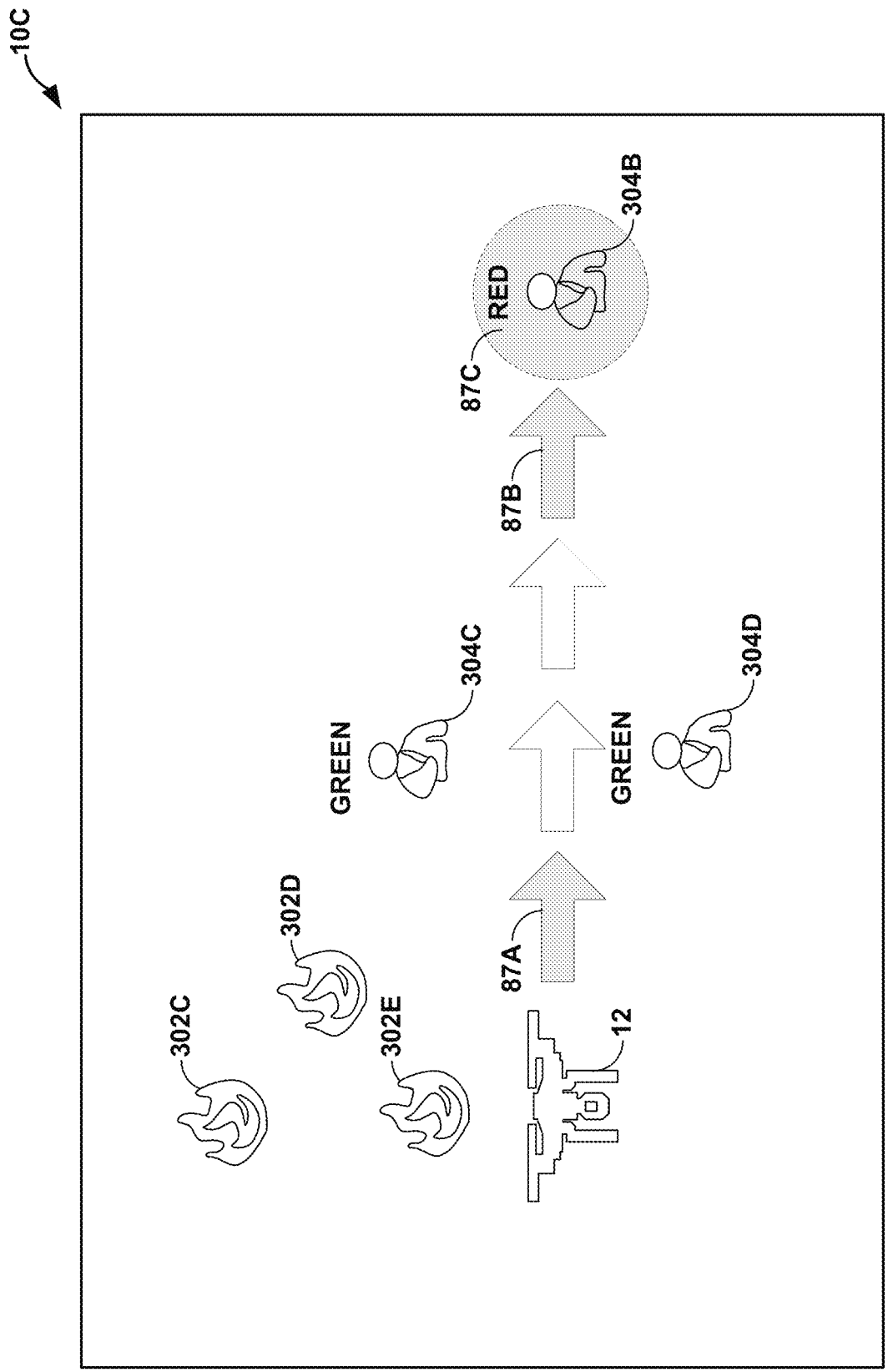
FIG. 4 is a diagram illustrating an example of autonomous system of FIG. 1 in which the policy engine shown in FIGS. 1 and 2 has limited or no access to the autonomous device shown in FIG. 1.

Evaluation engine 208 may represent a unit configured to identify, based on action data 85, inflection points 208. In instances of full-access to autonomous device 12, evaluation engine 208 may identify inflection points 87 mathematically, as discussed in more detail with respect to the examples of FIGS. 3A and 3B. In instances of no or limited access to autonomous device 12, evaluation engine 208 may identify inflection points 87 based on predicated action data 83 and action data 85 as discussed in more detail with respect to the example of FIG. 4. In the example of FIGS. 3A, 3B, and 4, autonomous device 12 may operate according to models 20 trained using Q-learning with a factored state representation, and trajectories sampled for experimentation.

FIGS. 3A and 3B are diagrams illustrating an example of autonomous system of FIG. 1 in which the policy engine shown in FIGS. 1 and 2 has full access to the autonomous device shown in FIG. 1. In both FIGS. 3A and 3B, computing system 14 is not shown for ease of illustration purposes. Referring first to the example of FIG. 3A, autonomous system 10 is shown in a first state, where autonomous system 10 in the first state is denoted as autonomous system 10A.

As shown in the example of FIG. 3A, autonomous system 10A includes autonomous device 12 as an agent (e.g., a drone) configured as a rescue-bot capable of extinguishing fires 302A and 302B and assisting victim 304A, which may differ in severity of energy as denoted by the colors red, yellow, and green. This scenario may provide the advantage of being simple enough to facilitate experimentation while exhibiting real-world characteristics, such as conflicting objective (reducing fires, rescuing victims, and prioritizing by severity) and a dynamic environment (fires start and grow at varying rates).

For the full-access case shown in FIGS. 3A and 3B, state data engine 200 may perform state perturbations to fine inflection points, generating state data 79 to change states that may affect the action taken by autonomous device 12. Evaluation engine 208 may then identify inflection points 87 (which is another way of referring to changing action data 85) that highlight observational states that explanatory data engine 210 may utilize when generating explanatory data 89.

To identify inflection points 87, for a given state-action pair (s, a) in a trajectory, a support Supp(s, a) of a for s is given as a measure of the reason for choosing a over other actions in s, and the importance Importance(i, s, a) of a given space feature $x_i$ is provided as the importance that feature has on the decision for taking a in s per the following:

$$Supp(s, a) = Q(s, a) - \max_{a': d \neq a} Q(s, a')$$

$$Importance(i, s, a) = Supp(s, a) - \frac{\sum_{v \in Values(x_i)} Supp(s^{x_i = v}, a)}{n}$$

where i is the feature index, s is the state $\langle x_1, x_2, \ldots, x_n \rangle$, a is an action, $s^{x_i = v}$ is s with a single feature $x_i$ changed to value v. Q(s, a) is a function for the expected utility resulting from taking action a in state s. If Q changes greatly when $x_i$ is perturbed, evaluation engine 208 may determine that feature made a significant contribution to the Q value of that state. Evaluation engine 208 may be configured to give greater weight to variants that consider positive and negative changes separately depending on the domain.

Similarly, evaluation engine 208 may be configured to perform sensitivity analysis on an existing trajectory by perturbing actions taken and re-running from those points. Using sensitivity analysis, evaluation engine 208 may discover and present inflection points 87 that show where small comparatively changes in action lead to divergent outcomes, thereby providing a better understanding of autonomous device 12. For a given state-action pair (s, a) trajectory point, evaluation engine 208 may identify the distribution of outcome states. State data engine 200 may force autonomous device 12 to take a different action through perturbing state data 79, while evaluation engine 208 may sample several new trajectories using a current policy, marking those whose outcome state distribution differed greatly from the unperturbed one.

In the example of FIG. 3A, state data engine 200 may perturb the state of autonomous system 10A by removing victim 304A to create the autonomous system 10B. Based on this change in state and the different actions (where in FIG. 3A autonomous device 12 moves forward and identifies the victim as the crux of the decision made by autonomous device 12, while in FIG. 3B autonomous device 12 takes an entirely different course of action, prioritizing the closer fire, fire 302B). In this respect, evaluation engine 208 may identify inflection points 87, which explanatory data engine 210 may expose as explanatory data 89.

In this respect, policy engine 80 may iteratively specify the state data in a manner that explores some or all of the observational states capable of being detected by autonomous device 12 in an effort to induce inflection points 87.

FIG. 4 is a diagram illustrating an example of autonomous system of FIG. 1 in which the policy engine shown in FIGS. 1 and 2 has limited or no access to the autonomous device shown in FIG. 1. Again, in FIG. 4, computing system 14 is not shown for ease of illustration purposes. Autonomous system 10 is shown in a third state, where autonomous system 10 in the third state is denoted as autonomous system 10C.

As shown in the example of FIG. 4, autonomous system 10C includes the autonomous device 12, fires 302C-302E, and red victim 304B along with two green victims 304C and 304D. Autonomous device 12 is shown as selecting actions that move away from fires 302C-302E to red victim 304B, which results in inflection points 87A-87C as explained in the following table:

| Policy | Predicted Action | Reason |
| --- | --- | --- |
| 1 | Extinguish | Fire near, no victim yellow |
| 2 | MoveSelf | Objective: red victim |

According to policy 81A (which may represent policy 1 in the table), predicated action data 83A indicated that autonomous device 12 should extinguish the nearby fire, fire 302E, resulting in the explanatory data 89A (which may be denoted as "reason 89A") of "fire near, no victim yellow." Policy 87A thereby incorrectly predicted the extinguish event. Policy 81B (which may represent policy 2 in the table) correctly predicted the move action as predicted action data 83B, and the resulting explanatory data 89B indicates correctly that the objective is red victim 304B, inferred by examining objects affected by the agent near next inflection point 87B. As such, the machine learning models may have as features human understandable combinations of objects around the drone (which is one example of autonomous device 12), and these form the basic vocabulary for explanations. In this way, policy engine 80 may operate independently from autonomous device 12 and obtains state data 79 through inspection of environments 10A and 10B in which autonomous device 12 operates.

In other words, state data engine 200 may obtain, responsive to identifying inflection point 87A (where inflection points are marked as points along the trajectory where the best predicting model changed), state data $79B_T$ representative of a second observational state detected by autonomous device 12. Action data collection engine 206 may next obtain, responsive to identifying inflection point 79A, action data 85B representative of one or more second actions autonomous device 12 performs responsive to detecting the second observational state. Policy training engine 202 may then train policy 81B, based on state data 79B$_T$ and action data 85B, policy 81B. State data engine 200 may then obtain, after training policy 81B, state data 79B$_S$ representative of a third observational state detected by autonomous device 12. Action data collection engine 206 may also obtain, after training policy 81B, action data 85B representative of one or more third actions autonomous device 12 performs responsive to detecting the third observational state.

Policy application engine 204 may apply, to state data 79B$_S$, policy 81B to obtain action data 85B representative of one or more third predicted actions that autonomous device 12 is predicted to perform responsive to the third observational state. Evaluation engine 208 may identify, based on action data 85B and predicted action data 83B, a second inflection point 87B representative of changing behavior of autonomous device 12. Explanatory data generation engine 210 may next determine, based on inflection point 79B, explanatory data 89B representative of portions of state data 79B$_S$ on which autonomous device 12 relied that explain the changing behavior of autonomous device 12. Policy engine 80 may then output explanatory data 89B as discussed above relative to the table.

In any event, the foregoing may follow the assumption that autonomous device 12 always act to improve utility, thus significant changes in the world, such as fulfilling goals, would result in behavioral changes. The foregoing techniques may approach the observational case stemmed from cognitive psychology experiments that showed human preference for simply, single-cause explanations, and "black-box" approaches for classification explanations.

Referring back to the example of FIG. 2, explanatory data generation engine 201 may represent a unit configured to identify, based on inflection points 87 and state data 79, explanatory data 89 of the type discussed in detail above. Policy engine 80 may provide this explanatory data 89 for use in the various ways discussed above.

Figure 5:
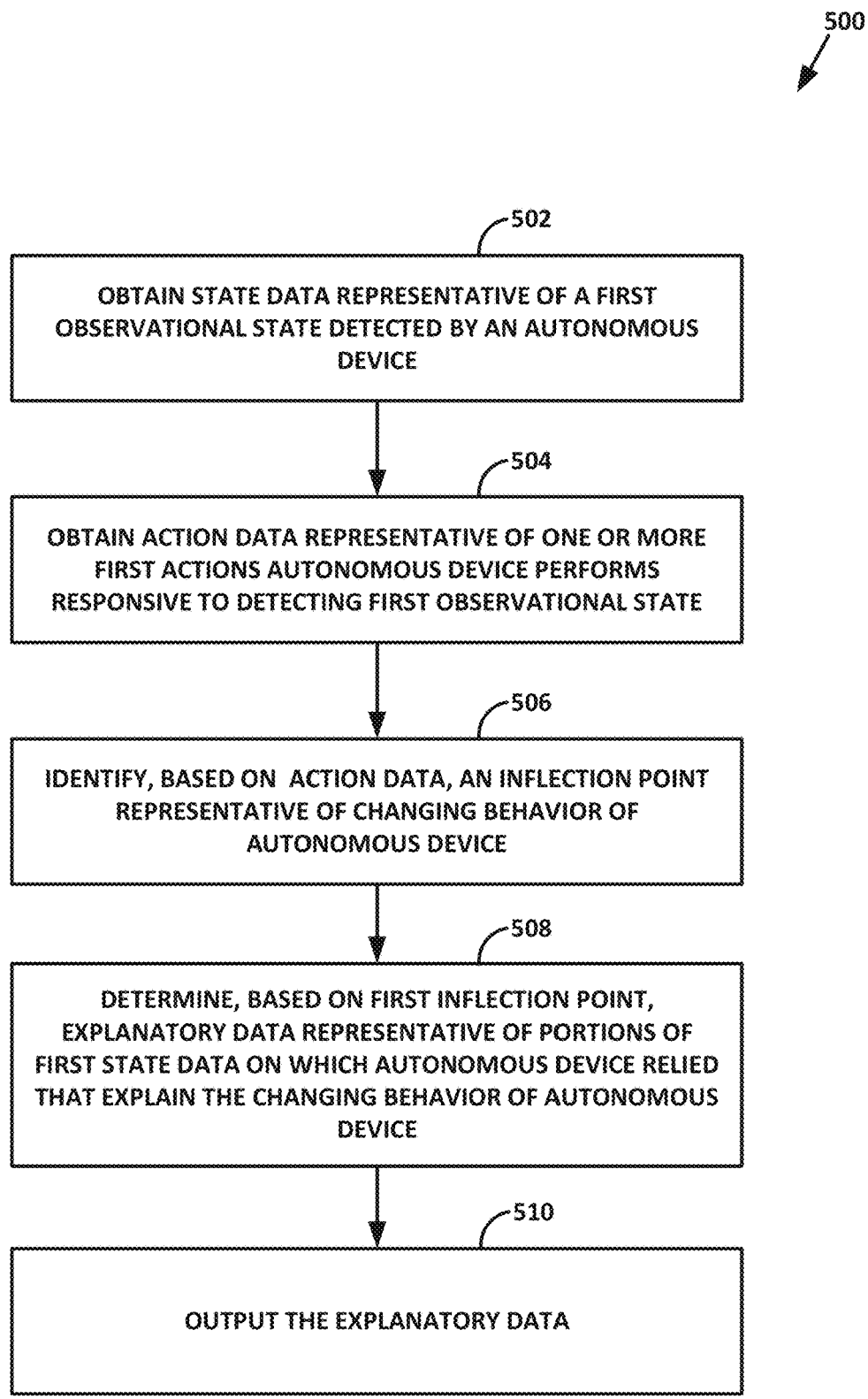
FIG. 5 is a flowchart illustrating example operation of the computation engine of the computing system shown in FIG. 1 in performing various aspects of the evaluation techniques described in this disclosure.

FIG. 5 is a flowchart illustrating example operation of the computation engine of the computing system shown in FIG. 1 in performing various aspects of the evaluation techniques described in this disclosure. Computation engine 52 of computing system 14 may be configured to perform an algorithm 500 shown in the example of FIG. 5.

According to algorithm 500, computation engine 52 may first obtain state data 79 representative of a first observational state detected by the autonomous device (502), and action data 85 representative of one or more actions taken by autonomous device 12 responsive to detecting the first observational state (504). Computation engine 52 may identify, based on the action data 85, an inflection point 87 representative of changing behavior of autonomous device 12 (506). Computation engine 52 may then determine, based on inflection point 87, explanatory data 89 representative of the portions of state data 79 on which autonomous device 12 relied that explain the changing behavior of autonomous system 12 (508). Computation engine 52 may then output explanatory data 89 (510).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

What is claimed is:

1. A device configured to explain a behavior of an autonomous device, the device comprising:
one or more memories configured to:
store first state data representative of a first observational state detected by the autonomous device that operates according to one or more trained machine learning models; and
store first action data representative of one or more first actions the autonomous device performs responsive to detecting the first observational state; and
a computation engine executing one or more processors, the computation engine configured to:
identify, based on the first action data, a first inflection point representative of changing behavior of the autonomous device;
determine, responsive to identifying the first inflection point, first explanatory data representative of portions of the first state data on which the one or more trained machine learning models relied that explain the changing behavior of the autonomous device; and
output the first explanatory data.

2. The device of claim 1, wherein the computation engine is configured to display the first explanatory data.

3. The device of claim 1, wherein the computation engine is configured to iteratively specify the first state data in a manner that explores some or all of the observational states capable of being detected by the autonomous device in an effort to induce the first inflection point.

4. The device of claim 1,
wherein the computation engine is further configured to apply, to the first state data, a first policy to obtain first predicted action data representative of one or more first predicted actions that the autonomous device is predicted to perform responsive to the first state data, and
wherein the computation engine is configured to identify, based on the first action data and the first predicted action data, the first inflection point representative of the changing behavior of the autonomous device.

5. The device of claim 4, wherein the first policy comprises a linear classifier that is an additive combination of features that are used to make a classification decision.

6. The device of claim 4, wherein the computation engine is configured to operate independently from the autonomous device and obtain the first state data through at least one of 1) inspection of an environment in which the autonomous device operates, and 2) the behavior of the autonomous device within that environment.

7. The device of claim 6, wherein the computation engine is further configured to train, based on the first state data and the first action data, the first policy.

8. The device of claim 4, wherein the computation engine is configured to identify, when the first action data is different than the first predicted action data, the first inflection point representative of the changing behavior of the autonomous device.

9. The device of claim 4, wherein the computation engine is further configured to:
obtain, responsive to identifying the first inflection point, second state data representative of a second observational state detected by the autonomous device;
obtain, responsive to identifying the first inflection point, second action data representative of one or more second actions the autonomous device performs responsive to detecting the second observational state;
train, based on the second state data and the second action data, a second policy;
apply, to the second state data, the second policy to obtain second predicted action data representative of one or more second predicted actions that the autonomous device is predicted to perform responsive to the second state data, and
determine, based on a comparison of the first predicted action data and the second predicted action data and responsive to identifying the first inflection point, the explanatory data.

10. A method of explaining a behavior of an autonomous device, the method comprising:
obtaining, by a computation engine executed by one or more processors, first state data representative of a first observational state detected by the autonomous device that operates according to one or more trained machine learning models;
obtaining, by the computation engine, first action data representative of one or more first actions the autonomous device performs responsive to detecting the first observational state;
identifying, based on the first action data and by the computation engine, a first inflection point representative of changing behavior of the autonomous device;
determining, based on the first inflection point and by the computation engine, first explanatory data representative of portions of the first state data on which the one or more trained machine learning models relied that explain the changing behavior of the autonomous device; and
outputting, by the computation engine, the first explanatory data.

11. The method of claim 10, wherein outputting the first explanatory data includes displaying the first explanatory data.

12. The method of claim 10, further comprising iteratively specifying the first state data in a manner that explores some or all of the observational states capable of being detected by the autonomous device in an effort to induce the first inflection point.

13. The method of claim 10, further comprising applying, to the first state data, a first policy to obtain first predicted action data representative of one or more first predicted actions that the autonomous device is predicted to perform responsive to the first state data,
wherein identifying the first inflection point comprises identifying, based on the first action data and the predicted action data, the first inflection point representative of the changing behavior of the autonomous device.

14. The method of claim 13, wherein the first policy comprises a linear classifier that is an additive combination of features that are used to make a classification decision.

15. The method of claim 13,
wherein the computation engine is configured to operate independently from the autonomous device, and
wherein obtaining the first state data includes obtaining the first state data through inspection of an environment in which the autonomous device operates.

16. The method of claim 13, further comprising training, based on the first state data and the first action data, the first policy.

17. The method of claim 13, wherein identifying the first inflection point comprises identifying, when the first action data is different than the first predicted action data, the first inflection point representative of the changing behavior of the autonomous device.

18. The method of claim 13, further comprising:
obtaining, responsive to identifying the first inflection point, second state data representative of a second observational state detected by the autonomous device;
obtaining, responsive to identifying the first inflection point, second action data representative of one or more second actions the autonomous device performs responsive to detecting the second observational state;
training, based on the second state data and the second action data, a second policy;
applying, to the second state data, the second policy to obtain second predicted action data representative of one or more second predicted actions that the autonomous device is predicted to perform responsive to the second state data, and
determining, based on a comparison of the first predicted action data and the second predicted action data and responsive to identifying the first inflection point, the explanatory data.

19. A non-transitory computer-readable storage medium having stored thereon instructions that, when executed, cause one or more processors to execute a computation engine configured to:
obtain first state data representative of a first observational state detected by an autonomous device, wherein the autonomous device is operating according to one or more trained machine learning models;
obtain first action data representative of one or more first actions the autonomous device performs responsive to detecting the first observational state;

identifying, based on the first action data, a first inflection point representative of changing behavior of the autonomous device;

determining, responsive to identifying the first inflection point, first explanatory data representative of portions of the first state data on which the one or more trained machine learning models relied that explain the changing behavior of the autonomous device; and outputting the first explanatory data.

20. The non-transitory computer-readable storage medium of claim 19, wherein the instruction includes instructions that cause the one or more processors to:

apply, to the first state data, a first policy to obtain first predicted action data representative of one or more first predicted actions that the autonomous device is predicted to perform responsive to the first state data, identify, based on the first action data and the predicted action data, the first inflection point representative of the changing behavior of the autonomous device;

obtain, responsive to identifying the first inflection point, second state data representative of a second observational state detected by the autonomous device;

obtain, responsive to identifying the first inflection point, second action data representative of one or more second actions the autonomous device performs responsive to detecting the second observational state;

train, based on the second state data and the second action data, a second policy;

apply, to the second state data, the second policy to obtain second predicted action data representative of one or more second predicted actions that the autonomous device is predicted to perform responsive to the second state data, and determine, based on a comparison of the first predicted action data and the second predicted action data and responsive to identifying the first inflection point, the explanatory data.

* * * * *